July 16, 1957     J. M. WOLFSKILL     2,799,789
PIEZOELECTRIC CRYSTAL APPARATUS AND
METHOD OF MAKING THE SAME Filed April 6, 1949     5 Sheets-Sheet 1

INVENTOR.
JOHN M. WOLFSKILL

BY

July 16, 1957  J. M. WOLFSKILL  2,799,789
PIEZOELECTRIC CRYSTAL APPARATUS AND
METHOD OF MAKING THE SAME
Filed April 6, 1949   5 Sheets-Sheet 2

INVENTOR.
JOHN M. WOLFSKILL
BY
*his Attorney*

July 16, 1957

J. M. WOLFSKILL 2,799,789

PIEZOELECTRIC CRYSTAL APPARATUS AND
METHOD OF MAKING THE SAME

Filed April 6, 1949

INVENTOR.
JOHN M. WOLFSKILL

BY
*Wm. J. Chromy*
*his attorney*

INVENTOR.
JOHN M. WOLFSKILL

United States Patent Office 2,799,789
Patented July 16, 1957

2,799,789

PIEZOELECTRIC CRYSTAL APPARATUS AND METHOD OF MAKING THE SAME

John M. Wolfskill, Erie, Pa.

Application April 6, 1949, Serial No. 85,832

16 Claims. (Cl. 310—9)

This invention relates to piezoelectric crystals in general. More particularly this invention relates to piezoelectric crystals of high stability and methods of manufacture.

It is an object of this invention to provide a piezoelectric crystal of greatly improved stability over a wide temperature range.

It is another object of this invention to provide a method of processing piezoelectric crystals so as to eliminate sudden activity dips or fluctuations over a wide temperature range.

It is a further object of this invention to produce piezoelectric crystals with different degrees of abrasive finishes on the crystal without materially changing the frequency of the crystal during this operation.

It is another object of this invention to provide a process wherein complete control of the surface finish of piezoelectric crystals may be obtained.

It is another object of this invention to provide a method of producing piezoelectric crystals with different thicknesses in specified areas on the faces of the crystal.

It is another object of this invention to provide a piezoelectric crystal which has increased stiffness or reduced series capacity in the equivalent circuit thereof.

It is another object of this invention to produce a piezoelectric crystal which has increased frequency stability when changing from one type of oscillator circuit to another.

It is another object of this invention to reduce the effects of input circuit capacitance on the actual frequency of the crystal unit.

Another object of this invention is to provide a means of obtaining varying surface finishes over different areas on the faces of such crystals.

Another object of this invention is to provide a process for producing piezoelectric crystals in which activity dips and frequency jumps over wide temperature ranges have been substantially eliminated so that it is not necessary to submit the piezoelectric crystals to temperature runs for activity.

Another object of this invention is to provide a piezoelectric crystals in which activity dips and frequency jumps over wide temperature ranges have been greatly reduced, said crystal having electrode areas of relatively high finish that are masked while the crystal blank around the masked areas is abraded in a tumbling or sandblasting operation to reduce the coupling between the desired mode of vibration with the undesired modes.

Other and further objects of this invention wil be apparent to those skilled in the art to which it relates from the following specification and claims.

In the prior art of manufacturing quartz piezoelectric crystals particularly of the plate type, or high frequency shear type units, one of the biggest problems has been to provide a crystal which maintains a high, constant activity level and which is also completely free from frequency jumps, as the temperature of the crystal is varied over a temperature range. Variations in activity of the piezoelectric crystal under the method of manufacture heretofore used took place over either a relatively wide temperature change or they took place over a very small temperature change even to the extent of complete stoppage of oscillation. Even though such crystals were tested over the complete temperature range for proper activity it was possible that the temperature intervals of the measurements, which are usually 2, 3 or 5° C. would completely miss such an activity dip. This resulted in a piezoelectric crystal, which in service would either drop below the required activity level to drive the following vacuum tube stage or stop oscillation completely interrupting the operation of the radio transmitter. These activity dips in the piezoelectric crystal are accordingly extremely serious and can result in complete failure of the radio equipment at some specific temperature.

Another type of activity dip which may take place over a wide temperature range is generally one of a gradual change, but it is nevertheless serious in that the piezoelectric crystal activity level may fall below that required. However, a crystal which fails to meet the minimum requirement over the temperature range would be rejected in test. These, of course, can be weeded out but nevertheless they increase the overall manufacturing cost. Accompanying the activity dips, whether the dip takes place over a narrow temperature interval or over a large temperature range is a very sudden change in frequency of oscillation of the crystal unit. This frequency change may be of such an order as to take the equipment completely out of the operating frequency tolerance allowed, at some temperature and one degree above or below this temperature the frequency may jump back to within the allowed tolerance. It is, therefore, almost necessary to test crystals which have these characteristics continuously as the temperature is being varied, in order to make absolutely certain that the crystals will meet the activity requirements throughout the entire operating temperature range and stay within the operating tolerance at all points throughout this operating temperature range.

It is the purpose of this invention to provide a method of so processing piezoelectric crystals to eliminate these sudden frequency and activity changes as the temperature is varied. The causes of these sudden changes are due to the main oscillation frequency of the crystal being coupled to other modes of vibration in the crystal. It is well known in the art for instance that low temperature coefficient crystals are the result of the balancing of temperature coefficients of several modes of motion in the crystal. Since the piezoelectric crystal is an extremely complex vibrating system, there are many such coupled modes, generally of low order which can manifest themselves and exert influence on the main desired mode. Much effort has been expended in trying to reduce these bothersome coupled vibrations.

Clamping of the periphery or corners of a crystal tend to reduce the effect of other modes of vibration to the main mode, but this is by no means a complete solution. Edging and beveling of the periphery or edges of the piezoelectric crystal blank also tends to reduce the activity dips in pressure type mountings but the effect is still prevalent to a marked degree.

In the plated type of crystal where the electrodes are formed contiguously to the crystal surfaces the slight advantage of restraining the crystal by clamps on the corners or on the periphery cannot be used unless the holder is further complicated by applying such electrodes and spring pressure. General practice in the art has been to mount plated units by means of small wire clips or other means, making connections directly to the plated surfaces. The crystal plate in this case is, therefore, an extremely free device and the thickness vibration can be coupled to length, width, or diameter modes, or multiples of such modes, and interfere with the desired mode.

Clamping of the crystal by various forms of loading with pastes, cements and solder have been resorted to, in attempts to get rid of such activity dips and frequency changes, but these have been largely ineffective. Crystal blanks have been dimensioned, to get rid of activity dips by making length, width, and/or diameter of the crystal such that the main or desired response would fall between the interfering multiples of the low frequency length and width modes. On individual crystals this method has been reasonably successful, but there are many responses in a crystal which cannot be accounted for by the width, length, or diameter of the crystal alone, and there is, therefore, no direct accounting for many of the multiple responses obtained in such crystals, and the dips or coupled effects cannot be controlled.

In many of the high frequency plate type crystals the area of the plated electrode is deliberately reduced to half or less than half the crystal area in an attempt to drive only that area of the crystal. Even though only the central area is excited, however, it has been demonstrated that a crystal blank which is reasonably flat so as to have adequate activity will oscillate almost in its entirety. This has been shown by lycopodium powder patterns on the surface of the crystal and by interferometer measurements. The phenomena is understandable inasmuch as quartz has a high modulus, and as such, a flat parallel plate is a fairly high Q vibrating system. Even though the electrode then is confined to the very center, it is still coupled to the other modes almost as strongly as if the entire plate were covered by the electrode, and, therefore, no significant advantage is obtained in freedom from activity dips, sudden frequency changes or frequency discontinuities by this expedient. A disadvantage of small central electrodes, occurs in crystals which are not extremely flat and parallel, in that a given area on a crystal which varies in thickness may be coupled to the desired mode, and may be of sufficiently different thickness from the thickness under the plated electrode area, so that the frequency of oscillation will actually jump from the desired mode to the frequency controlled by that portion of the thickness which is different from the central area. This may occur any number of times throughout a temperature range.

It is also well known in the art that high finishes on crystal surfaces increases the general activity level and a high finish would be desirable from this standpoint. It does, however, greatly aggravate the effect of coupled modes, and makes the activity dips and frequency change with temperature even more serious. The degree of finish, therefore, cannot be of such a high value that advantage can be taken of high finish to produce high activity levels.

This invention circumvents these difficulties by enabling the desired finish to be placed on the area of the crystal which is excited, whether it be almost the full area of the crystal, or less than half the area. The invention also enables these activity areas to be located anywhere on the crystal face, or it enables several areas of any desired configuration to be placed on the crystal face, which have the desired finish, or on other areas having different finishes from that part which is excited.

It also enables a change in thickness to be made of the unexcited area from that of the excited area, which remains a fixed thickness during the process, so that any thickness mode oscillations coupled to the desired mode and which are outside the excited area, will be of a vastly different frequency and, therefore, cannot interfere with the desired mode.

The invention also enables a contoured surface to be obtained outside of the excited area, or it makes possible the formation of a very small raised or pedestal portion which is the excited area. All of these configurations can be obtained with little or no effect on the actual frequency of the desired mode during the processing. In other words the actual frequency of the crystal can be adjusted to the desired value prior to this processing, and then this process applied to eliminate coupling to other modes, and the frequency of the crystal will still be the desired frequency.

In producing piezoelectric crystals in accordance with this invention, the area of the piezoelectric crystal which it is desired to excite and over which the contiguous electrodes are to be placed, is masked off from the remainder of the crystal blank by any one of several methods. A method used has been that of placing cellophane or similar adhesive tape on both the crystal faces in the area to be protected from the tumbling or sandblasting action. The desired area to be masked can be painted with any number of resilient paints such as Glyptal, printer's ink or lacquers. Good results have been obtained by using thin sheets of rubber pasted onto the crystal surface by means of rubber cement. If it is desired to not actually produce an abrupt drop or step off from the area of the crystal to be excited, contours on the surface of the crystal blank outside the masked area can be obtained by varying the thickness of the mask, such that the aggregate particles and fine abrasive used in the tumbling operation, abrade to a lesser extent immediately adjacent to the edge of the masked area and to a greater extent near the edge of the crystal blank. This same contour can be obtained by increasing the size of the aggregate used in the tumbler inasmuch as the abrasive action is obtained by the mass of the aggregate sliding over the crystal surface with the finer abrasive grains between the aggregate and the crystal surface. A low pressure grinding action takes place and any desired contour may be obtained by varying the thickness of the mask, that is the height of the mask above the adjacent crystal surface, and the size of the aggregate particles.

During the tumbling operation, of course, the masked area is completely obscured from any action of the abrasive and after the tumbling operation is completed, the mask may be removed and the original high finish or desired finish which was originally placed on the crystal prior to the tumbling still remains, as well as the original frequency of the crystal blank.

Crystals so processed can then be plated by evaporation or any of several well known methods, and can then be spot plated to frequency with much greater accuracy and speed simply because the activity and frequency are stable, and do not vary during the spot plating operation as do units manufactured under the old art.

In pressure mounted units where stainless steel or other electrodes are held against the crystal faces by means of spring pressure, the same process can be used to provide crystal units of greatly increased frequency and activity stability.

Another result accomplished by this method of processing is that the edges of the crystals are slightly chamfered, the operation removes any slight chips or cracks in the surface because of the low pressure abrasive action. This actually tends to heal the crystal surface from any previous operations and provides increased stability. Subsequent etching can be done on the entire blank to adjust it to frequency. The combination of low pressure abrasive action outside the active area and subsequent etching, provides frequency and activity stability not only over wide temperatures ranges but also with time, of an accuracy unknown prior to this invention.

Other features of this invention will be apparent to those skilled in the art from the following specification and the drawing in which briefly:

Figure 3a is a side view of the crystal and the protective coatings shown in Figure 3 prior to abrasion in the sandblasting apparatus or in the tumbling apparatus;

Figure 3b is a view of the crystal shown in Figures 3 and 3a after abrasion and after the protective coatings were removed showing the way in which the sections of the crystal around the active protected sections have been abraded away;

Figure 4a is a side view of the crystal shown in Figure 4 illustrating the relatively thick masks applied thereto;

Figure 4b is a view showing the crystals shown in Figures 4 and 4a after abrasion and after the thick masks were peeled off;

Figure 5a is a side view of the crystal shown in Figure 5;

Figure 5b is a side view of the crystal shown in Figures 5 and 5a after abrasion and removal of the masks;

Figure 6a is a side view of the crystal shown in Figure 6;

Figure 6b is a side view of the crystal shown in Figures 6 and 6a after abrasion and removal of the masks;

Figure 8a is a side view of the crystal shown in Figure 8 showing the masks applied to both faces;

Figure 8b is a side view of the crystals shown in Figures 8 and 8a after abrasion and removal of the masks;

Figure 8c is a side view of a crystal blank in which masks such as the mask shown in Figure 8, are applied to opposite and not corresponding surfaces of the major faces of the crystal;

Figure 8d is a side view of the crystal blank shown in Figure 8c after the crystal blank has been abraded and the protective masks peeled off or removed;

Figure 10a is a side view of the crystal shown in Figures 9 and 10;

Figure 12a is a side view of the crystal shown in Figure 12;

Figures 1, 2, 3:
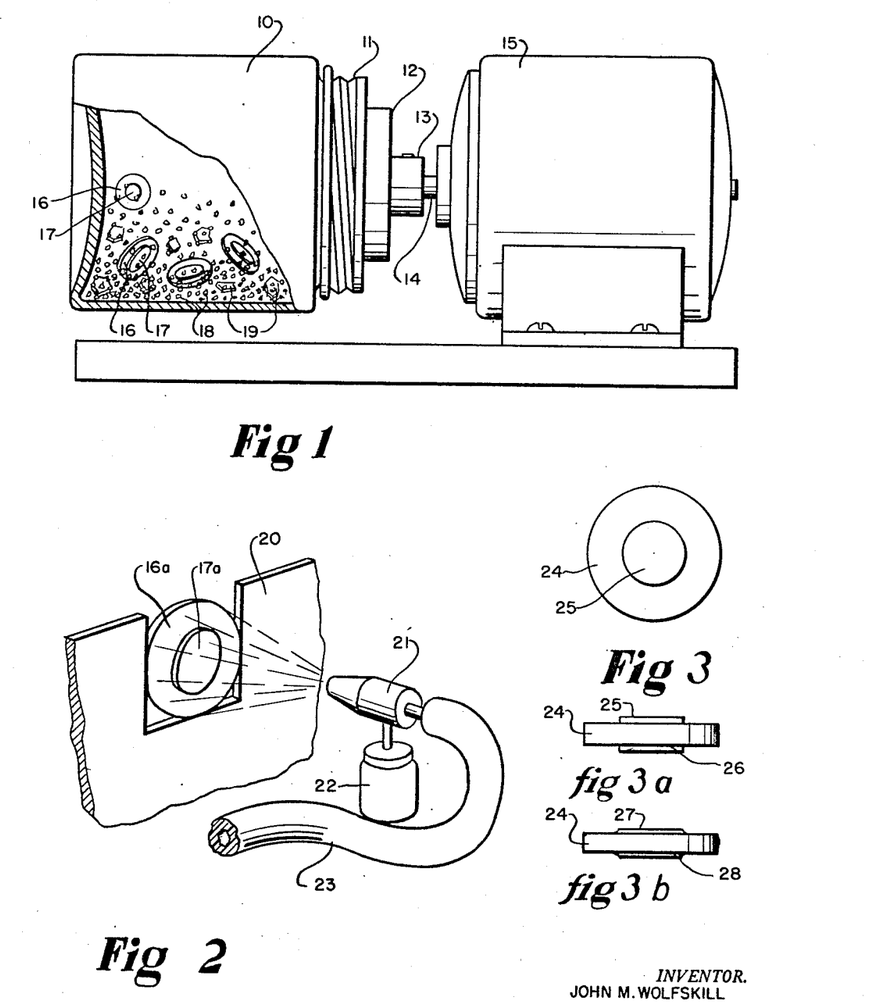
Figure 1 is a view of the tumbling apparatus showing the tumbling container in partial section with the abrasive and the aggregate and the piezoelectric crystals with the protective coatings applied thereto inside of the tumbler container.
Figure 2 is a view showing the piezoelectric crystals with the protective coating applied to one side thereof, the crystal being mounted in position to be sandblasted.
Figure 3 is a view of a circular piezoelectric crystal with the protective coating shown on one side thereof.

Referring to Figure 1 in detail there is illustrated a tumbling apparatus employing a tumbling jar 10 provided with a screw cover 11 that is attached to the flange 12. The flange 12 is attached to the member 13 that receives the end of the shaft 14 and is firmly attached thereto. The motor 15 is preferably a slow speed motor adapted to rotate the shaft 14 at about 60 revolutions per minute although, any conventional motor may be employed with a suitable speed reduction gear to obtain this reduced speed.

The inside of the jar 10 is loaded with one or more piezoelectric crystals 16 provided with protective masks 17 attached to the active surfaces thereof. A quantity of abrasive which may consist of Number 240 Carborundum and Number 8 garnet aggregate is also placed into the container 10 together with the piezoelectric crystals. Of course, the size of the Carborundum particles and the garnet aggregate may be varied depending upon the abraded finish desired and the tumbling operation.

The piezoelectric crystals 16 placed in the tumblers 10 may consist of one or more crystals of substantially the same size or they may consist of one or more crystals of the types shown in Figures 3, 4, 5, 6, 7 and 8 and these may all be tumbled together in the container 10 with the Carborundum particles 18 and the garnet 19 by suitably energizing the motor 15 so as to slowly rotate the container 10. As shown in Figure 1 each of the piezoelectric crystals 16 is provided with a mask 17. One or more of these masks are positioned on each side or each major face of each of the piezoelectric crystals to protect the finished surfaces of these major faces.

Before the crystal blanks 16 are placed in the tumbler 10 they are ground and lapped to the desired frequency and the electrode portions of the major faces are given the desired high finish to make these portions as nearly flat as possible. Even minute depressions are eliminated from these electrode portions so far as is practical and the surface is highly finished to increase the piezoelectric activity. These electrode areas are then covered with protective coatings 17 which extend over the highly finished electrode areas on both of the major faces. These protective coatings may consist of any material that will stand the abrasive action encountered in the tumbling or sandblasting operation. In practice it has been found that these masks or protective coatings may be made of adhesive tape such as "Scotch tape," discs of resilient rubber cemented to the crystal faces by rubber cement, or cellophane cemented to the crystal faces by collodion. Furthermore various paints, lacquers and inks have been found satisfactory for these masks. Material such as "Glyptal" also may be used.

Furthermore the abrasion process in accordance with this invention may be carried out by sandblasting apparatus such as disclosed in Patent No. 2,345,648. Simplified apparatus of this type is shown in Figure 2 wherein the crystal blank 16a may be held in a recess formed in the carrier 20 by resilient side walls provided to this recess. While only one sandblast nozzle 21 for sandblasting one side of the crystal 16a is shown, two such nozzles may be employed in practice and in that case both sides of the crystal blank 16a may be sandblasted simultaneously. Also by adjusting the pressure on each of the sandblasting nozzles so that the pressure against the major faces of the crystal blank 16a are equal, supporting the crystal blank 16a in the recess of the carrier 20 is facilitated. At the same time the pressure from the sandblast nozzles 21 may be increased so that the crystal blank 16a may be abraded more rapidly. Each of the sandblast nozzles is provided with a hose connection 23 leading to a suitable source of compressed air or other fluid or liquid medium under pressure. A container 22 for abrasive particles is attached to the nozzle 21 by a suitable tube and the abrasive particles are sucked into the nozzle 21 from the container 22 and propelled under pressure against the surface of the crystal blank 16a that is to be abraded. Each major face of the crystal blank 16a is provided with a protective covering or mask 17a that is cemented to the finished crystal face corresponding to the crystal electrode area. After the major faces of the crystal 16a are abraded to the desired extent the crystal is removed from the recess in the carrier 20 and the protective coatings 17a are also removed either mechanically or by a suitable solvent or both. The crystal blank is cleaned and it is then ready for application of electrodes thereto as will be described in further paragraphs of this specification.

In Figure 3 and Figure 3a there is illustrated a circular blank 24 having circular protective coatings 25 and 26 cemented to the opposite major faces to cover the finished active areas of the crystal blank during the abrading operation. The masks 25 and 26 are made of resilient abrasion resisting material as previously described and cover areas of the crystal blank that function as the active portions of the crystal and determine the frequency of oscillation thereof. Thereof, it is not desired to further abrade these active portions. The annular or ring shaped portions around the masks 25 and 26 are to be abraded to the tumbler shown in Figure 1 or the sandblast shown in Figure 2 until the electrode areas of the crystal blank 24 stand out in relief as shown by the raised portions 27 and 28 illustrated in Figure 3b. These raised portions 27 and 28 are shown somewhat exaggerated and in practice it may not be desirable to cut away as much of the crystal material around the electrode areas as indicated in this or in the other figures. Furthermore the thickness and diameter of the crystal blank shown in Figures 3, 3a and 3b is also somewhat exaggerated in order to explain this invention more clearly. However, this invention may be applied to piezoelectric crystals of different frequencies for example crystal blanks having frequencies between 1 megacycle and 10 megacycles may be processed in accordance with this invention and the amount of crystal material abraded to eliminate the piezoelectric activity dips varies over the frequency range. For example in the one megacycle crystal blanks the thickness of the material abraded may be on the order of 0.002 inch and in the case of the 10 megacycle crystal blanks the thickness abraded may be on the order of 0.00002 inch. For intermediate frequencies corresponding thicknesses may be abraded depending upon the frequency of the crystal. The relation between the thickness of the material abraded and the crystal frequency is substantially linear between these two frequency limits.

By employing the No. 8 garnet aggregate and the No. 240 Carborundum abrasive in the tumbler shown in Figure 1 operating at about 60 revolutions per minute, the ratio of the garnet to the Carborundum being about 10 to 1, that is, 100 cc. of the garnet aggregate to 10 cc. of the Carborundum good results were obtained with a load of anywhere from 1 to 50 piezoelectric crystals. A decrease in thickness of the crystal blanks of 20 to 30 millionths of an inch were obtained in a 24 hour tumbling period. Thus tumbling of the 10 megacycle crystals for about 24 hours produced the desired decrease in thickness in these crystals to eliminate the activity dips commonly observed in these crystals during the temperature runs. By processing the crystals in accordance with this invention such success was obtained in eliminating activity dips at different temperatures that it is now possible to dispense with the laborious temperature runs heretofore performed on the crystals.

Figure 4:
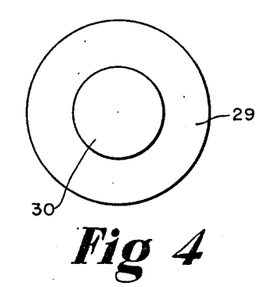
Figure 4 is a top view showing another circular crystal with the protective coating or mask applied to the top thereof.

In Figure 4 and Figure 4a there is illustrated a piezoelectric crystal 29 to which thick masks 30 and 31 have been applied for the purpose of producing a certain desired contour to the abraded crystal. The abrasion of the crystal shown in Figure 3 produced a step effect as shown in Figure 3b whereas the abrasion of the crystal shown in Figure 4 produced a tapered or sloping effect as shown in Figure 4b in which the surfaces of the edge portions of the crystal surrounding the active areas 32 and 33 gradually slope toward the edge of the crystal. This tapered or sloping effect was obtained by using masks 30 and 31 of material such as rubber one-sixteenth of an inch or more in thickness depending upon the degree of contour desired. In this case the thickness of the masks prevents the garnet aggregate from abrading close to the mask. If desired the size of the garnet aggregate may be increased so that only the portions of the piezoelectric crystal adjacent to the circumference will be abraded to a substantial extent. On the other hand smaller size aggregate particles may be used if it is desired to abrade closer to the edge of the mask. It will therefore be seen that by varying the thickness of the mask and the size of the aggregate practically any desired shape or contour may be obtained.

Figure 5:
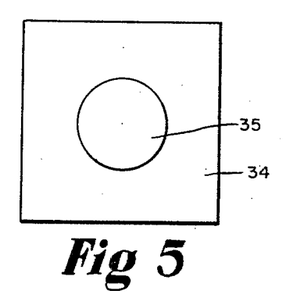
Figure 5 is a top view of a square crystal with a mask applied to the top surface.

Piezoelectric crystals of any configuration such as circular, elliptical, square or rectangular may be processed in accordance with this invention and in Figure 5 and Figure 5a there is shown a square crystal 34 with masks 35 and 36 attached to the major faces thereof. The thick masks 35 and 36 applied to the crystal 34 produces the contour crystal shown in Figure 5b after abrasion. After the masks 35 and 36 are removed the electrode faces 37 and 38 which were previously finished are again exposed as heretofore explained.

In Figures 6, 6a, 7 and 7a there are illustrated piezoelectric crystal blanks in which a pair of active areas are provided on each major face of the crystal blanks. Masks 40 and 41 are provided to cover the finished active areas of one major face of the crystal blank 39 and masks 42 and 43 are provided to cover the finished active areas on the other major face of the crystal 39. After abrasion the active areas of the crystal 39 stand out in relief from the rest of the crystal blank as shown somewhat exaggerated at 44, 45, 46 and 47 in Figure 6b. These active areas are indicated as steps in Figure 6b however, by providing different thicknesses of masks 40, 41, 42 and 43 the active areas 44, 45, 46 and 47 may be gradually contoured into the inactive areas if desired. Of course in cases where the active areas are given a high finish there is also considerable contrast between this finish and that of the inactive somewhat roughly abraded areas.

Figure 6:
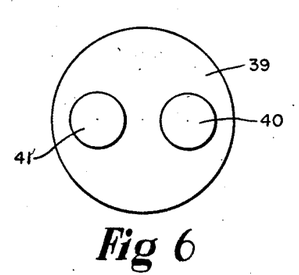
Figure 6 is a top view of a circular crystal with a pair of protective masks applied to different active areas.
Figure 7:
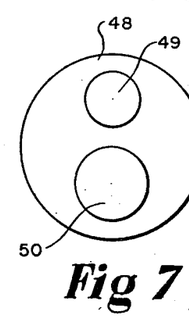
Figure 7 is a top view of a circular crystal with a pair of masks of different sizes covering active areas of different sizes.

In Figure 6 the active areas on each side of the crystal blank are shown as being of substantially the same size. However, active areas of different sizes may be provided as shown in Figure 7 wherein the masks 49 and 51 cover opposite active areas of substantially the same size and the masks 50 and 52 cover opposite areas of a different size. It is not necessary that the corresponding active areas on the two sides of the crystal blank be of exactly the same size, for example, the active area covered by the mask 49 may be of slightly different size from that covered by the mask 51 and the same is true of the active areas covered by the masks 50 and 52. Furthermore it is not essential that the abraded contours on each side of the crystal blank be exactly the same. Thus the masks 49 and 50 or one of them may be thicker or thinner than the masks 51 and 52 and in this way the abraded surface contouring around the active areas 53 and 55 or around one of these areas may be different from the contouring around either or both of the active areas 54 and 56 shown in Figure 7b where the abraded crystal 48 is illustrated in a side view.

Figure 6C:
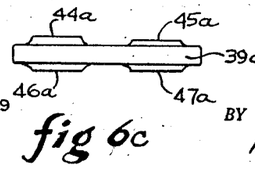
Figure 6c is a side view of a crystal similar to that shown in Figure 6b, in which two active sections which are of different thicknesses, are provided.

Likewise the masks employed on the crystal blanks in the other views of the drawing may be thicker on one side of the crystal blank than the masks on the other side of the crystal blank so that different contours are obtained on the two major faces on the crystal blank. Also the thicknesses between the active areas 44a—46a and the active areas 45a—47a of the crystal 39a may be slightly different as shown in Figure 6c so that the crystal 39a will oscillate at two frequencies if desired.

Figure 8:
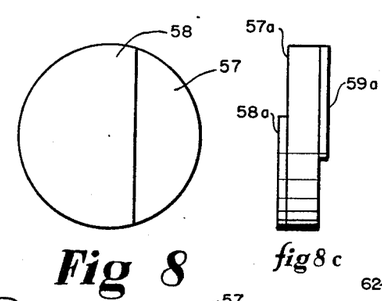
Figure 8 is a top view of a circular crystal with a mask extending over approximately the left hand two-thirds of the crystal face.

In Figure 8 there is illustrated a crystal blank 57, the major faces of which are provided with masks 58 and 59 of half moon or arcuate shape covering approximately two-thirds of the area of each major face are employed. The masks 58 and 59 are shown in Figure 8a positioned on corresponding areas of the opposite faces of the crystal so that active areas 60 and 61 shown in Figure 8b are protected from abrasion while the other areas of the crystal are being abraded. However, where the active areas of the major faces consist only of central zones of the crystal blank circular segmental masks 58a and 59a may be positioned on the major faces of the crystal blank as shown in Figure 8c. In this way only the central zone of the crystal blank 57a is preserved as the active portion. In other words it is not necessary to abrade all of the inactive areas of each of the major faces of the crystal blank. After the masks 58a and 59a are removed from the crystal 57a, that is, after abrasion the protected areas 60a and 61a are left exposed and electrodes are applied thereto. However, only the corresponding and opposite portions of the areas 60a and 61a function as active areas of the crystal blank. These corresponding areas define the central zone of the crystal blank.

Figure 9:
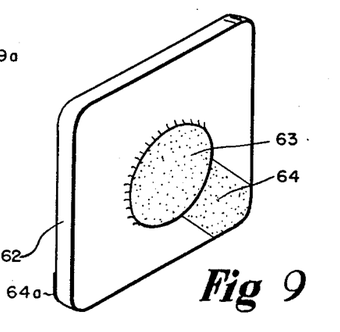
Figures 9 and 10 are views of the front and back of and abraded square crystal similar to that shown in Figure 5b after electrodes have been applied thereto.
Figure 10:
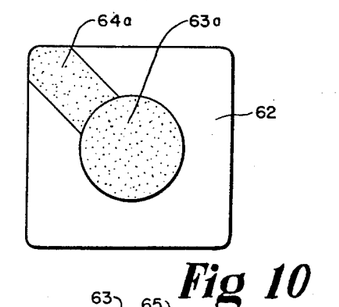

After the crystal blanks are abraded and the masks are removed the crystal blanks are thoroughly cleaned and electrodes are applied to the active portions or surfaces of the major faces as shown in Figures 9, 10, 10a, 11, 12, 12a, 13 and 13a. These electrodes may be applied in various ways such as plating, sputtering and evaporation that are well known in the art. In Figures 9 and 10 there is illustrated a crystal blank 62 after abrasion and cleaning with electrodes 63 and 63a applied to the active areas thereof. Suitable connections 64 and 64a are provided to the electrodes 63 and 63a respectively and these connections may be applied by plating, sputtering and evaporation the same as the electrodes. After the electrodes and connections are provided to the crystal blank 62 suitable wire mounts as shown in Figure 15 may be provided.

Figure 11:
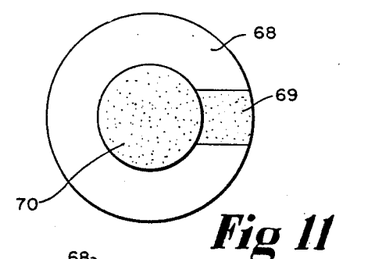
Figure 11 is a top view of abraded crystals such as shown in Figures 3b and 4b after electrodes have been applied thereto.
Figure 12:
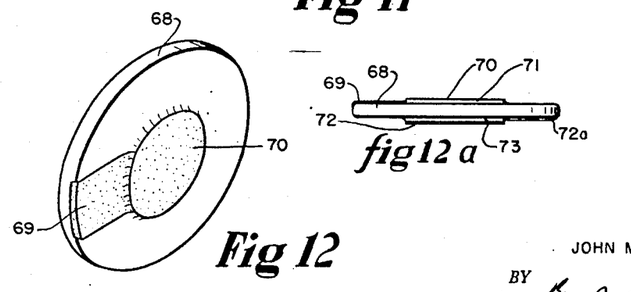
Figure 12 is a prospective view of the crystal shown in Figure 11.

The circular crystal 68 shown in Figures 11, 12 and 12a is also provided with electrodes and connections the same as the substantially square crystal as shown in Figure 9. However, in this case it is desirable that the connections 69 and 72a to the electrodes 70 and 72, respectively, be lined up with the X-axis as described in my co-pending application, Serial No. 1089 filed January 8, 1948, Patent No. 2,635,199, so that the wire mounts shown in Figure 14 may engage the crystal blank in alignment with the X-axis thereof.

Figures 13, 13A, 14, 15, 16, 17, 18:
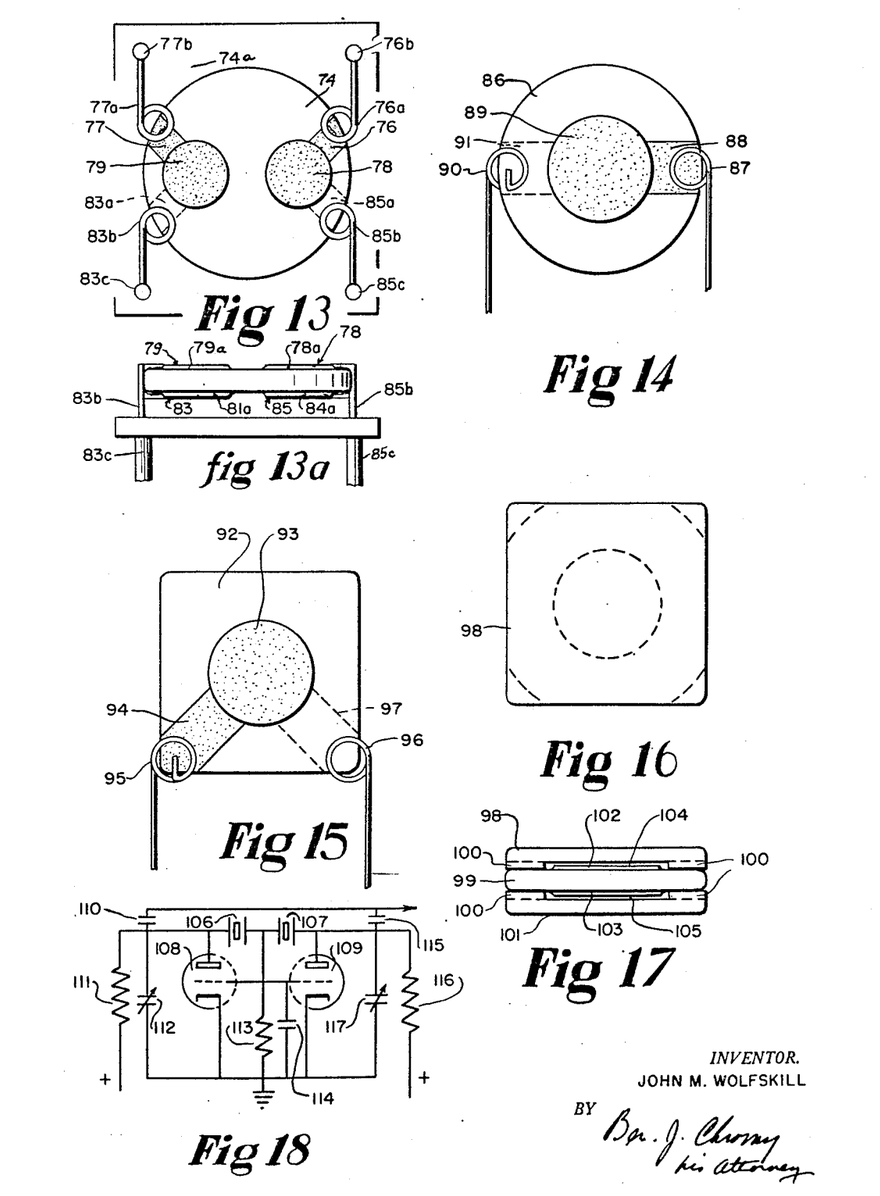
Figure 13 is a top view of the abraded crystal shown in Figure 6b after the electrodes have been applied thereto and connecting loops attached for contacting the electrodes and supporting the crystal.
Figure 13a is a side view of the crystal shown in Figure 13.
Figure 14 is a side view of crystals such as shown in Figures 11, 12 and 12a with resilient wire loops clamping opposite edges of the crystal to make contact to the electrode leads and to support the crystal.
Figure 15 is a side view of a crystal such as shown in Figures 9, 10 and 10a with resilient wire loops clamping the lower corners of the corners of the crystal to contact the electrode leads and support the crystal.
Figure 16 is a top view of a substantially square crystal and electrode arrangement.
Figure 17 is a side view of a crystal and electrode assembly applied to an abraded crystal similar to that shown in Figure 5b with the corners of the crystal clamped between the electrodes.
Figure 18 is a schematic wiring diagram of a piezoelectric crystal controlled oscillator that may be frequency controlled or stabilized by means of piezoelectric crystals such as shown in Figures 6, 7 and 13.

In Figure 13 and Figure 13a there is shown a crystal blank 74 with a pair of active areas on each major face as shown in Figure 6b, with electrodes applied thereto. Electrodes 78 and 79 are applied to the active areas 78a and 79a respectively on one side of the crystal blank and connections 76 and 77 are connected to these respective electrodes. On the other side of the crystal blank electrodes 83 and 85 contact the active areas 81a and 84a respectively and connections 83a and 85a are provided to these electrodes respectively.

Figures 7A, 7B:
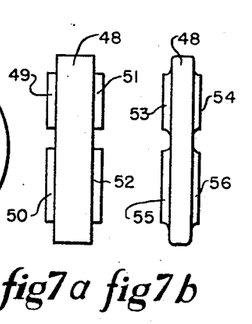
Figure 7a is a side view of the crystal shown in Figure 7.
Figure 7b is a side view of the crystal shown in Figures 7 and 7a after abrasion and after the masks were peeled off.

Wire mounts 76a, 77a, 83b and 85b are provided with small loops for clamping the edges of the crystal 74 and the end portions of the electrode connections 76, 77, 83a and 85a respectively. Parts of the loops of the wire supports 76a, 77a, 83b and 85b are soldered to the connections 76, 77, 83a and 85a respectively. The other ends of the wire supports and connections 76a, 77a, 83b and 85b are soldered or cemented by conductive cement to the upper ends of the contact pins 76b, 77b, 83c and 85c respectively and these pins are firmly held in the insulation member 74a that forms part of the crystal housing. The pins 76b, 77b, 83c and 85c are employed for the purpose of connecting the active areas of the crystal 74 associated with the electrodes 78, 79, 83 and 85, into an electrical oscillation generating or other circuit. In this cricuit the crystal blank shown in Figures 7 and 7a also may be provided with electrodes and electrode connections such as shown in Figures 13 and 13a after this crystal is abraded as shown in Figure 7b. In this case the electrodes applied to the active surfaces of the crystal blank will be of different sizes since the active areas of the crystal blank are of different sizes.

The crystal blank shown in Figure 14 is of circular shape and is provided with a centrally disposed active portion the faces of which are covered by electrodes such as electrode 89 shown in the front view. A similar electrode is provided to the corresponding active area on the back of the crystal and this electrode is provided with a connection 91 for the purpose of connecting the back electrode to the wire mount 90. The front electrode 89 is provided with a connection 88 that is in contact with the loop of the wire support 87. These loops 87 and 90 may also be soldered to the connections 88 and 91 respectively if desired.

In Figure 15 there is illustrated a square crystal with wire mounts 95 and 96 attached to the lower corners thereof. A front electrode 93 is provided to the active area of the crystal blank 92 and a corresponding electrode is provided to the backside of the crystal. This back electrode is provided with a connection 97 for the purpose of connecting this electrode to the wire mount 96 and a similar connection 94 is provided to the front electrode 93 for the purpose of connecting this electrode to the wire mount 95.

Square or rectangular crystal blanks may be mounted in an arrangement such as shown in Figures 16 and 17 wherein small corner pads 100 are provided to each of the metal plates 98 and 101 for clamping the crystal blank therebetween. These corner pads 100 are of such dimensions that the airgaps 104 and 105 provided between the surfaces of the active portions 102 and 103 of the crystal blank 99 and the electrodes 98 and 101 respectively are of a length on the order of 0.0005 inch for a crystal having a frequency of about 10 megacycles. In this crystal the raised central or active portions 102 and 103 give the crystal blank an additional thickness on the order of 20 to 30 millionths of an inch over the thickness of the abraded inactive portions of the crystal blank. In this holder the surfaces of the crystal 99 are not provided with contiguous electrodes as in the case of the other crystal blanks herein illustrated.

An oscillator circuit employing a pair of triode tubes 108 and 109 which may be positioned in one envelope and which are frequency controlled by means of the piezoelectric crystals 106 and 107 respectively is illustrated in Figure 18. The crystals 106 and 107 may be the active portions of a single crystal such as shown in Figures 6, 7 and 13 or they may be separate crystals. The crystals 106 and 107 are connected between the anodes and the grids of the tubes 108 and 109 respectively and the grids of these tubes are connected togther. A grid resistor 113 shunted by a capacitor 114 is connected between the grids and the cathodes. Capacitors 112 and 117 are connected between the anodes and cathodes of the tubes 108 and 109 respectively and positive anode potential is applied to the tubes 108 and 109 through the resistors 111 and 116 respectively. The anode circuits of these tubes are coupled to a mixing circuit by means of capacitors 110 and 115. This circuit may be employed for the purpose of obtaining a beat frequency between the frequencies of the crystals 106 and 107 and for this purpose the frequencies of these two crystals must differ by the value or the beat frequency desired and the crystal shown in Figure 6c may be employed for this purpose. Accordingly such a crystal as shown in Figure 13 would have to be provided with active portions of slightly different thicknesses, that is, the active portions between the electrodes 78—85 and 79—83 would be finished to slightly different thicknesses, as in the crystal 39a of Figure 6c, so that the resulting operation would produce the desired beat frequency.

Figure 19:
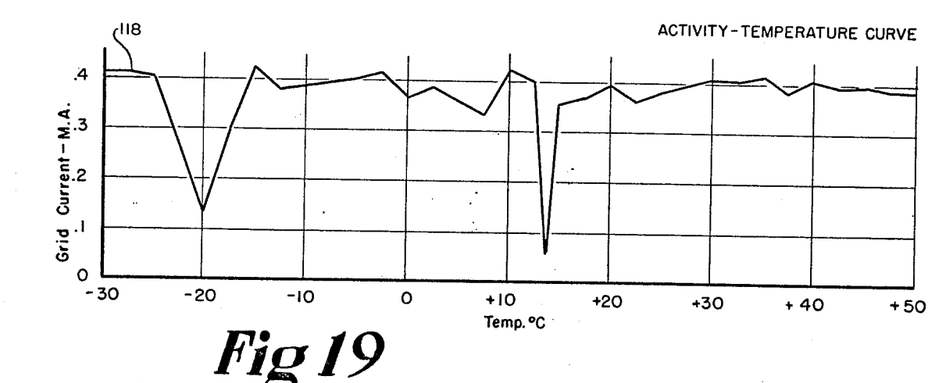
Figure 19 is an activity-temperature curve of a piezoelectric crystal prior to processing in accordance with this invention.
Figure 20:
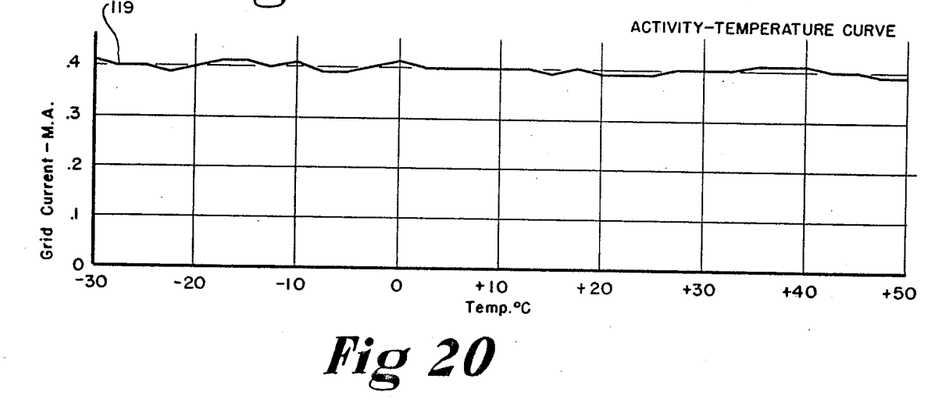
Figure 20 is an activity-temperature curve of the piezoelectric crystal after processing in accordance with this invention.

In Figure 19 there is shown an activity-temperature curve 118 obtained on a high frequency piezoelectric crystal as the temperature of the crystal was varied between −30° and +50° centigrade. This curve was obtained from a crystal prior to processing the crystal in accordance with this invention and it is apparent from this curve that two rather bad activity dips occur at −20° and approximately 15° centigrade. After the crystal was processed in accordance with this invention a relatively flat activity-temperature curve 119 as illustrated in Figure 20 was obtained. No bad dips in activity were obtained as the temperature of the processed crystal was varied between −30° and +50° centigrade.

Piezoelectric crystals processed in accordance with this invention produce substantially single frequency response. The equivalent series capacity of the crystal is reduced so that better frequency stability is obtained. The reactance curve of the crystal is steeper and different oscillator circuits have less effect upon the crystal frequency. Because the area of oscillation or the active areas of the crystal can be carefully controlled by masking that area, and then abrading the peripheral area that is outside the desired active area, the series capacity of the equivalent circuit of the crystal is reduced thereby, giving increased frequency stability in the oscillator circuit when circuit components are changed or when changing from one type of oscillator to another.

While I have described this invention in detail with respect to certain embodiments thereof it is of course understood that I do not desire to limit this invention to the exact details shown and described except in so far as they may be defined by the claims.

I claim:

1. The method of processing piezoelectric crystals to obtain high activity and freedom from activity dips and frequency jumps over a predetermined temperature range, the steps of providing substantially flat surfaces of high finish to the active sections of the major faces of the crystal blank, covering said flat surfaces corresponding to the electrode areas of the crystal blank with high resilient protective coverings, and roughening the crystal blank around said protective coverings to reduce the activity dips and frequency jumps in said crystal blank over a predetermined temperature range.

2. The method of processing piezoelectric crystals to obtain high activity and freedom from activity dips and frequency jumps over a predetermined temperature range, the steps of finishing the active sections of the major faces of the crystal blank to the desired frequency, covering said flat surfaces of the crystal blank with protective coverings, and roughening the crystal blank around said protective coverings to reduce the activity dips and frequency jumps in said crystal blank over a predetermined temperature range.

3. The method of processing piezoelectric crystal blanks to improve their piezoelectric activity and frequency stability comprising the steps of finishing the electrode areas of the crystal blank to obtain a high finish conducive to high piezoelectric activity, covering the aforesaid electrode areas with a protective coating, providing different degrees of roughness to the areas of the crystal blank around said protective coating to eliminate sudden activity dips as the temperature of the crystal blank is varied, removing said protective coating from said electrode areas and applying electrodes thereto.

4. The method of processing piezoelectric crystal blanks to improve their piezoelectric activity and frequency stability comprising the steps of finishing the electrode areas of the crystal blank to obtain a high finish conducive to high piezoelectric activity, and providing different degrees of roughness to the areas of the crystal blank around said electrode areas to eliminate sudden activity dips as the temperature of the crystal blank is varied.

5. The method of processing piezoelectric crystal blanks to improve their piezoelectric activity and frequency stability comprising the steps of finishing the electrode areas of the crystal blank to obtain a high finish conducive to high piezoelectric activity, and roughening the areas of the crystal blank around said electrode areas to different degrees to eliminate sudden activity dips as the temperature of the crystal blank is varied.

6. The method of processing piezoelectric crystal blanks to improve their piezoelectric activity and frequency stability comprising the steps of finishing the electrode areas of the crystal blank to obtain a high finish conducive to high piezoelectric activity, and roughening the areas of the crystal blank around said electrode areas to eliminate coupling of undesired vibration modes to the desired mode.

7. A piezoelectric crystal comprising a thin wafer like crystal blank having a pair of major faces and having a thickness that is small compared to a dimension of said major faces, said major faces having active areas of high finish to provide high piezoelectric activity over a predetermined temperature range, the areas of said crystal blank around said active areas having different finishes and dimensions such that thickness mode vibrations thereof do not interfere with the desired mode vibration of said active areas.

8. A piezoelectric crystal comprising a thin wafer like crystal blank having a pair of major faces and having a thickness that is small compared to a dimension of said major faces, said major faces having active areas of high finish to provide high piezoelectric activity over a predetermined temperature range, the areas of said crystal blank around said active areas having different finishes and being tapered off toward the edge of the crystal blank such that thickness mode vibrations thereof do not interfere with the desired mode vibration of said active areas.

9. A piezoelectric crystal comprising a thin wafer like crystal blank having a pair of major faces and having a thickness that is small compared to a dimension of said major faces, each of said major faces having corresponding active areas of high finish to provide high piezoelectric activity over a predetermined temperature range, the areas of said crystal blank around said active areas having a rough finish of such quality and dimensions that thickness mode vibrations thereof do not interfere with the desired mode vibration of said active areas.

10. A piezoelectric crystal comprising a thin wafer like crystal blank having a pair of major faces and having a thickness that is small compared to a dimension of said major faces, each of said major faces having several corresponding and individual active areas of high finish to provide high piezoelectric activity over a predetermined temperature range, the areas of said crystal blank around said active areas having rough finishes and dimensions such that thickness mode vibrations thereof do not interfere with the desired mode vibrations of said active areas.

11. A piezoelectric crystal comprising a thin wafer like crystal blank having a pair of major faces and having a thickness that is small compared to a dimension of said major faces, each of said major faces having at least a pair of active areas of high finish to provide high piezoelectric activity over a predetermined temperature range, the areas of said crystal blank around and between said active areas having different finishes and dimensions such that thickness mode vibrations thereof do not interfere with the desired mode vibration of said active areas.

12. A piezoelectric crystal comprising a thin wafer like crystal blank having a pair of major faces and having a thickness that is small compared to a dimension of said major faces, each of said major faces having at least a pair of active areas of high finish to provide high piezoelectric activity over a predetermined temperature range, the areas of said crystal blank around and between said active areas having different finishes and being tapered off toward the edge of the crystal blank such that thickness mode vibration do not interfere with the desired mode vibration of said active areas.

13. A piezoelectric crystal comprising a thin wafer like crystal blank having a pair of major faces and having a thickness that is small compared to a dimension of said major faces, each of said major faces having corresponding active areas of high finish to provide high piezoelectric activity over a predetermined temperature range, the areas of said crystal blank around said active areas having a rough finish of such quality and dimensions that thickness mode vibrations thereof do not interfere with the desired mode vibration of said active areas, said piezoelectric crystal blank active areas being of different thicknesses so that these areas are responsive to different frequencies.

14. A piezoelectric crystal comprising a thin wafer like crystal blank having a pair of major faces and having a thickness that is small compared to a dimension of said major faces, each of said major faces having several corresponding and individual active areas of high finish to provide high piezoelectric activity over a predetermined temperature range, the areas of said crystal blank around said active areas having rough finishes and dimensions such that thickness mode vibrations thereof do not interfere with the desired mode vibrations of said active areas, said piezoelectric crystal blank active areas being of different thicknesses so that these areas are responsive to different frequencies.

15. A piezoelectric crystal of high frequency stability in oscillator circuits using components of different values, comprising a thin wafer-like crystal blank having a pair of major faces and having a thickness that is small compared to a dimension of said major faces, said major faces having active areas of high finish to provide high piezoelectric activity over a predetermined temperature range, and the areas around said active areas being abraded to reduce the series capacity of the crystal blank and increase the frequency stability thereof.

16. A piezoelectric crystal of high frequency stability in oscillator circuits using components of different values, comprising a thin wafer-like crystal blank having a pair of major faces and having a thickness that is small compared to a dimension of said major faces, said major faces having substantially centrally disposed active areas of high finish to provide high piezoelectric activity over a predetermined temperature range, and the peripheral areas around said active areas being abraded to reduce the series capacity of the crystal blank and increase the frequency stability thereof.

References Cited in the file of this patent

UNITED STATES PATENTS

| | | |
|---|---|---|
| 1,886,815 | Hund | Nov. 8, 1932 |
| 1,890,164 | Rosenberger | Dec. 6, 1932 |
| 2,018,246 | Beard | Oct. 22, 1935 |
| 2,161,980 | Runge et al. | June 13, 1939 |
| 2,231,483 | Smalts | Feb. 11, 1941 |
| 2,245,178 | Bechmann | June 10, 1941 |
| 2,261,791 | Bokovoy | Nov. 4, 1942 |
| 2,306,909 | Sykes | Dec. 29, 1942 |
| 2,345,648 | Wolfskill | Apr. 4, 1944 |
| 2,486,916 | Bottom | Nov. 1, 1949 |
| 2,505,121 | Knights | Apr 25, 1950 |